United States Patent
Inoue et al.

(10) Patent No.: US 11,835,100 B2
(45) Date of Patent: Dec. 5, 2023

(54) DISC BRAKE

(71) Applicant: HITACHI AUTOMOTIVE SYSTEMS, LTD., Hitachinaka (JP)

(72) Inventors: Hayuru Inoue, Ayase (JP); Shoichi Noguchi, Kofu (JP)

(73) Assignee: HITACHI ASTEMO, LTD., Ibaraki (JP)

(*) Notice: Subject to any disclaimer, the term of this patent is extended or adjusted under 35 U.S.C. 154(b) by 361 days.

(21) Appl. No.: 17/255,152

(22) PCT Filed: Jul. 18, 2019

(86) PCT No.: PCT/JP2019/028222
§ 371 (c)(1),
(2) Date: Dec. 22, 2020

(87) PCT Pub. No.: WO2020/022176
PCT Pub. Date: Jan. 30, 2020

(65) Prior Publication Data
US 2021/0262542 A1 Aug. 26, 2021

(30) Foreign Application Priority Data

Jul. 25, 2018 (JP) .................................. 2018-139324

(51) Int. Cl.
*F16D 65/40* (2006.01)
*F16D 65/097* (2006.01)
(Continued)

(52) U.S. Cl.
CPC ....... *F16D 65/0978* (2013.01); *F16D 55/226* (2013.01); *F16D 65/0056* (2013.01); *F16D 2055/0008* (2013.01)

(58) Field of Classification Search
CPC .............. F16D 55/226; F16D 65/0056; F16D 65/0972; F16D 65/0974; F16D 65/0977; F16D 65/0978; F16D 2055/0008
See application file for complete search history.

(56) References Cited

U.S. PATENT DOCUMENTS 3,977,499 A * 8/1976 Johannesen ......... F16D 55/2262
188/73.38
4,214,649 A * 7/1980 Fujimori ............. F16D 65/0979
188/73.38
(Continued)

FOREIGN PATENT DOCUMENTS

EP 1 010 913 6/2000
GB 2093541 A * 9/1982 ......... F16D 65/0972
(Continued)

OTHER PUBLICATIONS

Abstract for JP 11-210787 (no date).*
(Continued)

*Primary Examiner* — Nicholas J Lane
(74) *Attorney, Agent, or Firm* — Wenderoth, Lind & Ponack, L.L.P.

(57) ABSTRACT

A friction pad mounted on a disk brake includes a back plate, and a lining attached to the back plate and configured to frictionally contact a disk. A spring member, configured to bias the friction pad toward a disk rotationally exiting side, is provided to an ear portion of the back plate. The spring member includes an attachment portion attached to the back plate, an extension portion extending from an end portion of the attachment portion, and an abutment portion folded back from the extension portion and extending in a direction toward the disk. The abutment portion is configured to receive a reaction force from a torque reception surface by abutting against the torque reception surface at a position on (Continued)

an opposite side of the ear portion from the disk when the ear portion and the torque reception surface of a mount member abut against each other.

1 Claim, 9 Drawing Sheets

(51) Int. Cl.
    *F16D 55/226*     (2006.01)
    *F16D 65/00*     (2006.01)
    *F16D 55/00*     (2006.01)

(56) References Cited

U.S. PATENT DOCUMENTS

| | | | | |
|---|---|---|---|---|
| 2007/0017756 A1* | 1/2007 | Takeo | ............... | F16D 55/226 |
| | | | | 188/73.39 |
| 2008/0135353 A1* | 6/2008 | Takeo | ............... | F16D 65/0977 |
| | | | | 188/73.39 |
| 2010/0326777 A1* | 12/2010 | Noguchi | ............... | F16D 65/0978 |
| | | | | 188/72.1 |
| 2012/0024641 A1* | 2/2012 | Ito | ............... | F16D 65/0978 |
| | | | | 188/72.1 |
| 2014/0345984 A1* | 11/2014 | Kamiya | ............... | F16D 65/0972 |
| | | | | 188/73.38 |
| 2015/0001011 A1* | 1/2015 | Zhang | ............... | F16D 65/12 |
| | | | | 188/72.3 |
| 2017/0307033 A1* | 10/2017 | Toguri | ............... | F16D 65/0972 |

FOREIGN PATENT DOCUMENTS

| | | | | |
|---|---|---|---|---|
| JP | 10331883 A | * | 12/1998 | |
| JP | 11210787 A | * | 8/1999 | |
| JP | 2000-179593 | | 6/2000 | |
| JP | 2011-12713 | | 1/2011 | |
| JP | 2013-167290 | | 8/2013 | |
| KR | 20020007609 A | * | 1/2002 | ......... F16D 65/0977 |

OTHER PUBLICATIONS

Abstract for JP 10-331883 (no date).*
Abstract for KR 20020007609 (no date).*
Machine translation of JP 2013-167290 (no date).*
International Search Report dated Aug. 13, 2019 in International Application No. PCT/JP2019/028222, with English Translation.
Written Opinion of the International Searching Authority dated Aug. 13, 2019 in International Application No. PCT/JP2019/028222, With English Translation.

* cited by examiner

DISC BRAKE

TECHNICAL FIELD

The present invention relates to a disk brake configured to provide a braking force to a vehicle such as an automobile and a friction pad mounted on the disk brake.

BACKGROUND ART

Generally, a disk brake mounted on a vehicle such as an automobile includes a mount member (a carrier) formed so as to extend across over a disk (a rotor) and attached to a non-rotatable portion of the vehicle, a friction pad including a back plate and a lining (a friction member) joined (fixedly attached) to this back plate and configured to be pressed against the disk due to a hydraulic pressure supplied to a caliper, and a spring member (a biasing portion) attached to this friction pad and configured to press this friction pad in a disk circumferential direction.

This spring member pre-presses the friction pad to a disk rotationally exiting side when the vehicle moves forward, thereby eliminating a clearance between the friction pad and the mount member (a torque reception surface). Due to this configuration, the generation of a clonk sound (a hitting sound) when the friction pad hits against the torque reception surface is prevented or reduced, when the vehicle is braked while moving forward. Further, an impact force is eased between the friction pad and the torque reception surface due to the elastic force of the biasing portion and the generation of the clonk sound is prevented or reduced, when the vehicle is braked while moving backward.

CITATION LIST

Patent Literature

PTL 1: Japanese Patent Application Public Disclosure No. 2011-12713

SUMMARY OF INVENTION

Technical Problem

On the other hand, in the above-described patent literature, PTL 1, when the vehicle is mildly braked while moving backward, an abutment load is low between the friction pad and the torque reception surface, which causes the friction pad to easily vibrate, thereby raising a possibility of generation of a brake squeal (a low-pressure squeal).

Solution to Problem

An object of the present invention is to provide a disk brake and a friction pad capable of preventing or reducing the brake squeal when the vehicle is braked while moving backward.

According to one aspect of the present invention, a disk brake includes a mount member fixed to a vehicle while extending across over a disk and including a torque reception surface that receives a torque when the vehicle is braked, and a friction pad including a back plate supported by the mount member and a lining as a friction member attached to this back plate. The back plate includes ear portions formed at side surface portions located on both sides in a disk circumferential direction. Each of the ear portions is configured to transmit the torque when the vehicle is braked by abutting against the torque reception surface of the mount member. The disk brake further includes a caliper slidably provided to the mount member and configured to press the friction pad against the disk, and a biasing portion provided between one of the ear portions of the friction pad that is located on a disk rotationally entering side when the vehicle moves forward, and the torque reception surface of the mount member that faces this one ear portion. The biasing portion is configured to bias the friction pad toward a disk rotationally exiting side.

Then, the biasing portion includes an attachment portion attached to the back plate, an extension portion extending from an end portion of the attachment portion in a direction away from the disk, and an abutment portion folded back from the extension portion and extending in a direction toward the disk. The abutment portion is configured to receive a reaction force from the torque reception surface by abutting against the torque reception surface at a position on an opposite side of the ear portion from the disk.

Further, according to one aspect of the present invention, a friction pad includes a back plate, and a lining as a friction member attached to this back plate. An ear portion is formed on each of both sides of the back plate in a longitudinal direction. The ear portion includes a biasing portion.

Then, the biasing portion includes an attachment portion attached to the back plate, an extension portion extending from an end portion of the attachment portion in a direction away from the lining, and an abutment portion folded back from the extension portion and extending in a direction toward the lining. The abutment portion is configured to receive a reaction force from a torque reception surface by abutting against the torque reception surface at a position on an opposite side of the ear portion from the lining in a direction perpendicular to a lining attachment surface of the back plate when the friction pad is mounted on the disk brake and the ear portion abuts against the torque reception surface of this disk brake.

Advantageous Effects of Invention

According to the one aspects of the present invention, it is possible to prevent or reduce the brake squeal when the vehicle is braked while moving backward.

DESCRIPTION OF EMBODIMENTS

In the following description, a disk brake according to an embodiment of the present invention will be described in detail with reference to the accompanying drawings.

Figure 1:
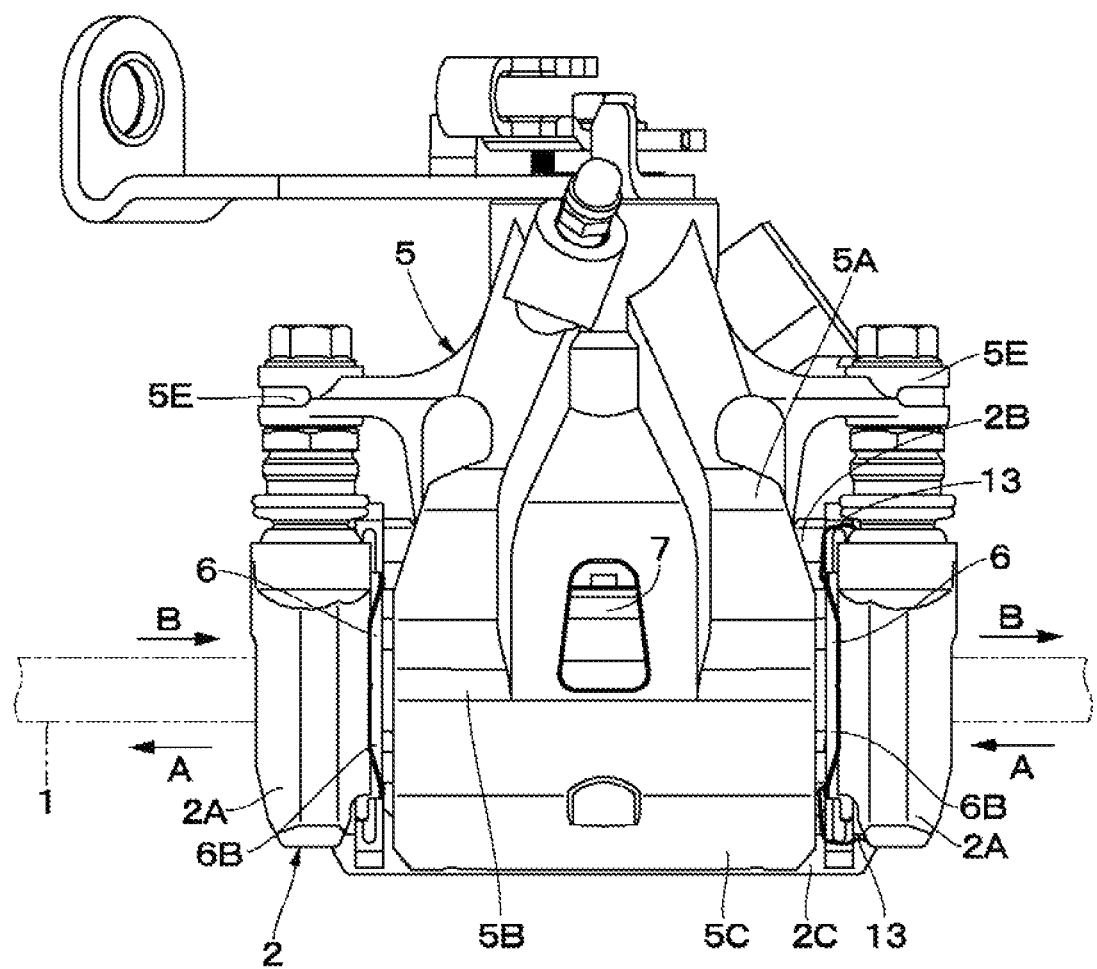
FIG. 1 is a plan view of a disk brake according to an embodiment of the present invention as viewed from above.
Figure 2:
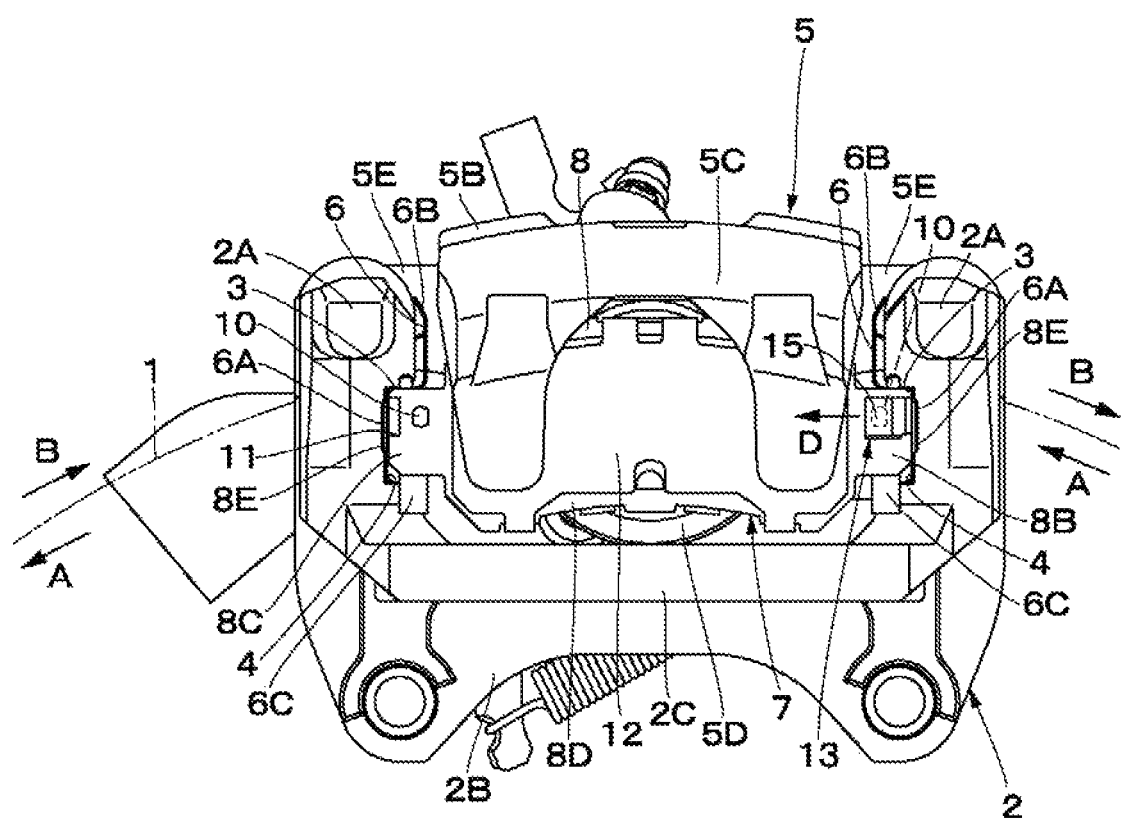
FIG. 2 is a front view of the disk brake as viewed from an outer side (the lower side in FIG. 1).

A disk 1 illustrated in FIGS. 1 and 2 is configured to, for example, rotate in a direction indicated by an arrow A together with a wheel (not illustrated) when a vehicle runs in an advancing direction, and rotate in a direction indicated by an arrow B when the vehicle moves backward.

A mount member (a carrier) 2 is fixed to a non-rotatable portion (not illustrated) of the vehicle while extending across over the disk 1. As illustrated in FIGS. 1 and 2, the mount member 2 includes a pair of arm portions 2A, a support portion 2B, and a reinforcement beam 2C. These arm portions 2A are spaced apart from each other in a rotational direction of the disk 1 (the left-right directions in FIGS. 1 and 2; in the present disclosure, referred to as a disk circumferential direction), and extend in an axial direction of the disk 1 (the vertical direction in FIG. 1, the front-back direction in FIG. 2; in the present disclosure, referred to as a disk axial direction) so as to extend across over the outer periphery of the disk 1.

The support portion 2B is provided so as to integrally connect the respective proximal end sides of the arm portions 2A to each other, and is fixed to the non-rotatable portion of the vehicle at a position located on an inner side of the disk 1. The reinforcement beam 2C couples the respective distal end sides of the arm portions 2A to each other at a position located on an outer side of the disk 1. Due to this configuration, these arm portions 2A of the mount member 2 are integrally coupled to each other via the support portion 2B on the inner side of the disk 1, and are also integrally coupled to each other via the reinforcement beam 2C on the outer side of the disk 1.

A disk path portion (not illustrated), which arcuately extends along the outer periphery (a rotational track) of the disk 1, is formed at the respective intermediate portions of the arm portions 2A of the mount member 2 in the disk axial direction. Inner-side and outer-side pad guides 3 are formed on the both sides of the disk path portion in the mount member 2 (the both sides in the disk axial direction), respectively.

In other words, the pad guides 3 as support portions supporting friction pads 7, which will be described below, are formed on the inner side and the outer side at portions of the mount member 2 in a disk circumferential direction (the both sides in the disk circumferential direction), respectively. Each of these pad guides 3 is formed as a recessed groove shaped like a squared U in cross section, and extends in a direction in which the friction pad 7, which will be described below, is slidably displaced, i.e., the disk axial direction.

Each of the pad guides 3 functions to guide the friction pad 7 in the disk axial direction via ear portions 8B and 8C of a back plate 8 forming the friction pad 7. Therefore, the ear portions 8B and 8C of the friction pad 7 (the back plate 8) are fitted to each of the pad guides 3 in the form of recess-protrusion fitting so as to be sandwiched thereby in a radial direction of the disk 1 (the front-back direction in FIG. 1 and the vertical direction in FIG. 2; in the present disclosure, referred to as a disk radial direction).

A bottom-side wall surface of each of the pad guides 3 forms a torque reception surface 4 as a so-called torque reception portion. This torque reception surface 4 bears a braking torque generated at the time of a brake operation (at the time of braking) via the ear portions 8B and 8C of the friction pad 7.

A caliper 5 is slidably provided to the mount member 2, and presses the friction pad 7 against the disk 1. This caliper 5 includes an inner leg portion 5A, a bridge portion 5B, and an outer leg portion 5C. The inner leg portion 5A is provided on the inner side, which is one side in the axial direction of the disk 1. The bridge portion 5B is provided so as to extend from the inner leg portion 5A to the outer side, which is the other side in the axial direction of the disk 1, as if extending across over the outer peripheral side of the disk 1 between the two arm portions 2A of the mount member 2. The outer leg portion 5C extends inward in the disk radial direction from the outer side, which corresponds to the distal end side of the bridge portion 5B, and forms a two-pronged (or bifurcated) claw portion at the distal end side thereof.

A cylinder (not illustrated), in which a piston 5D (refer to FIG. 2) is slidably inserted, is formed in the inner arm portion 5A of the caliper 5. Further, as illustrated in FIG. 1, a pair of mount portions 5E protruding in the disk circumferential direction are integrally provided to the inner leg portion 5A. Each of these mount portions 5E functions to slidably support the caliper 5 on each of the arm portions 2A of the mount member 2 via a sliding pin (not illustrated).

Each of pad springs 6 is mounted on each of the arm portions 2A of the mount member 2. Each of these pad springs 6 functions to elastically support the inner-side and outer-side friction pads 7, and also smooths a sliding displacement of each of these friction pads 7 in the disk axial direction. Each of the pad springs 6 is formed by performing bending processing (stamping) on, for example, a stainless steel plate having a spring property.

The pad spring 6 includes a pair of guide plate portions 6A, a connection plate portion 6B, and radial biasing plate portions 6C. The pair of guide plate portions 6A is formed by being bent into generally squared U shapes so as to be fitted to the respective pad guides 3 of the mount member 2, and is formed so as to be spaced apart from each other on the inner side and the outer side of the disk 1.

The connection plate portion 6B is formed so as to extend in the axial direction while extending across over the outer peripheral side of the disk 1 to integrally connect the respective guide plate portions 6A on the inner side and the outer side of the disk 1. The radially biasing plate portions 6C are formed integrally with the inner portions of the respective guide plate portions 6A in the disk radial direction.

Each of the guide plate portions 6A of the pad springs 6 is attached by being fitted to each of the pad guides 3 of the mount member 2, and guides the back plate 8 of the friction pad 7 in the disk axial direction via the protruding ear portion 8B or 8C. Each of the radially biasing plate portions 6C is in elastic abutment with the ear portion 8B or 8C of each of the friction pads 7 (the back plates 8) in each of the pad guides 3 of the mount member 2, thereby biasing the back plate 8 of each of the friction pads 7 outward in the disk radial direction. Due to this configuration, the pad spring 6 can smoothly guide the friction pad 7 along the guide plate portion 6A in the disk axial direction at the time of the brake operation, while preventing or reducing rattling of each of the friction pads 7.

Next, the friction pad 7, which is attached to the mount member 2, and a spring member 13, which presses the friction pad 7 in the disk circumferential direction, will be described.

The inner-side and outer-side friction pads 7 are disposed so as to face the both side surfaces of the disk 1 in the axial direction. Each of the friction pads 7 includes the back plate 8 and a lining 9. The back plate 8 extends in the disk circumferential direction, and is shaped like a flat plate. The lining 9 is joined (fixedly attached) to a lining attachment surface 8A, which is one of the surfaces of this back plate 8 that faces the disk 1, and serves as a friction member in frictional contact with the surface of the disk 1 (the side surface in the axial direction). The back plate 8 can be made from metal, resin, and the like.

The back plate 8 of the friction pad 7 includes the ear portions 8B and 8C serving as protruding fitted portions at the side surface portions located on the both sides in the disk circumferential direction, respectively. In other words, the ear portions 8B and 8C are formed on the both sides of the back plate 8 in the longitudinal direction. Each of these ear portions 8B and 8C is configured to be fitted to the pad guide 3 of the mount member 2 in the form of the recess-protrusion fitting. Then, each of the ear portions 8B and 8C forms a torque transmission portion that transmits a braking torque that the friction pad 7 receives from the disk 1 at the time of the brake operation performed on the vehicle by abutting against the torque reception surface 4 of the mount member 2.

Figure 3:
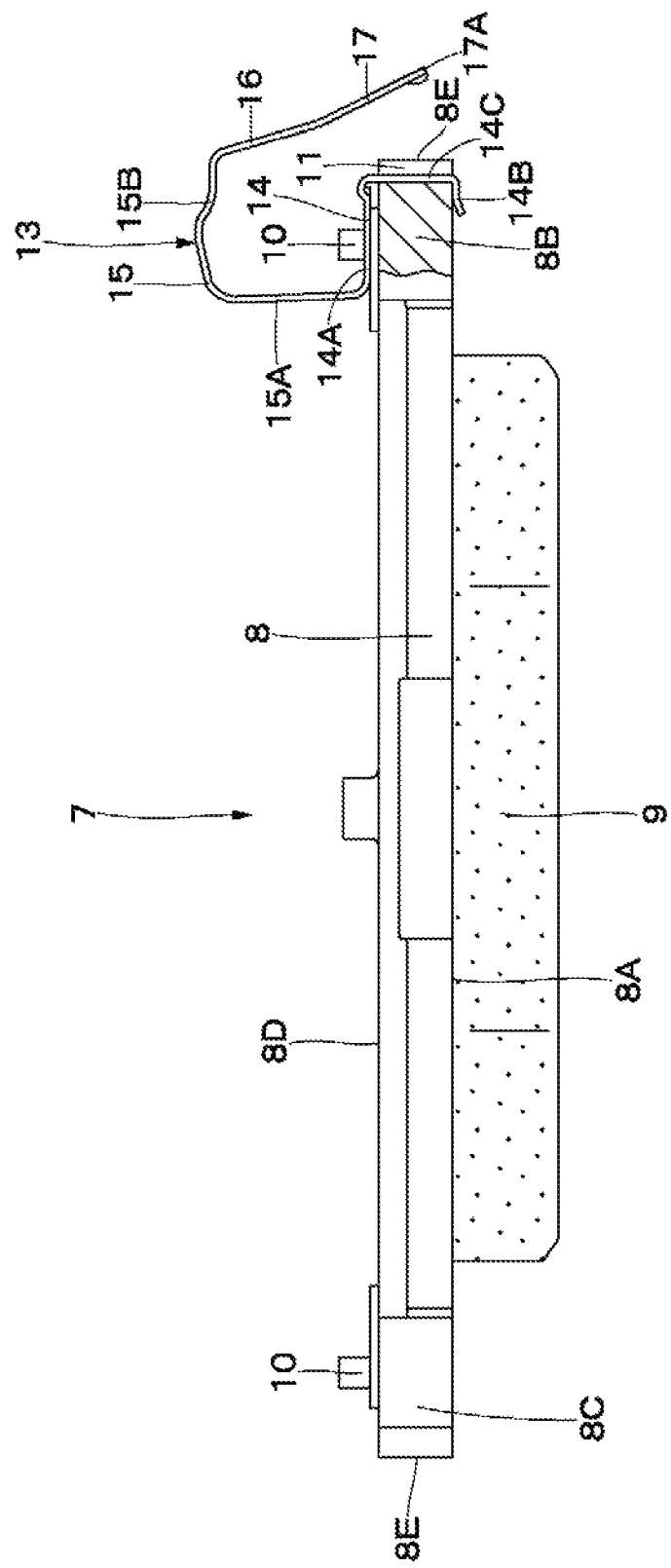
FIG. 3 is a plan view with a partial cutaway that illustrates an inner-side friction pad and a spring member in an enlarged manner.

The ear portions 8B and 8C of the friction pad 7 (the back plate 8) are horizontally symmetrically formed, and have identical shapes to each other. Now, the ear portion 8B, which is one (the right one in FIG. 3) of the ear portions, is disposed on the entrance side (a disk rotationally entering side) in the rotational direction of the disk 1 rotating in the direction indicated by the arrow A when the vehicle moves forward. The ear portion 8C, which is the other (the left one in FIG. 3) of the ear portions, is disposed on the exit side (a disk rotationally exiting side) in the rotational direction of the disk 1. The spring member 13, which will be described below, is attached to the ear portion 8B, which is one of the two ear portions 8B and 8C that is located on the rotationally entering side of the disk 1.

Protrusions 10 are provided to the back plate 8 of the friction pad 7 at positions near the proximal end sides (the base sides) of the two ear portions 8B and 8C, respectively. These respective protrusions 10 are provided so as to protrude on a back surface 8D (a surface opposite from the lining attachment surface 8A on which the lining 9 is provided, the back surface) side of the back plate 8. One of these protrusions 10 that is located on the disk rotationally entering side is used to position the spring member 13, which will be described below, relative to the back plate 8. More specifically, an engagement hole 14D of the spring member 13 is engaged (fitted) with the one of the protrusions 10.

Groove portions 11 are formed on surfaces 8E of the two ear portions 8B and 8C of the back plate 8 that face the torque reception surfaces 4 of the pad guides 3, respectively. Each of these groove portions 11 is formed by cutting the facing surface 8E, which is the end surface of the ear portion 8B or 8C on the distal end side (the protruding side) thereof, into a recessed shape. One of these groove portions 11 that is located on the disk rotationally entering side forms a housing space for housing a part of the spring member 13, which will be described below, and the spring member 13 is disposed in this groove portion 11 while extending in the disk axial direction.

Shim plates 12 for squeal prevention are detachably attached to the inner-side and outer-side friction pads 7 at positions on the back surface 8D sides of the back plates 8 (only the outer-side shim plate 12 is illustrated in FIG. 2). The outer-side shim plate 12 is disposed between the outer leg portion 5C of the caliper 5 and the back plate 8, and functions to prevent the generation of so-called a break squeal therebetween by preventing them from directly contacting each other. On the other hand, the inner-side shim plate is disposed between the piston 5D fittedly inserted in the inner leg portion 5A of the caliper 5 and the back plate 8, and functions to prevent the generation of a break squeal therebetween by preventing them from directly contacting each other.

The spring member 13 is mounted between the ear portion 8B located on the disk rotationally entering side when the vehicle moves forward, which is one of the two ear portions 8B and 8C of each of the back plates 8 respectively forming the inner-side and outer-side friction pads 7, and the torque reception surface 4 of the mount member 2 facing the ear portion 8B. The spring member 13 forms a biasing portion in the present invention, and has a pressing function of pressing the friction pad 7 in the disk circumferential direction (the disk rotationally exiting side) by biasing the pad guide 3. The spring member 13 is formed by performing bending processing (stamping) on, for example, a stainless steel plate having a spring property. Then, the spring member 13 includes an attachment portion 14, an extension portion 15, an abutment portion 16, and a contact portion 17.

The attachment portion 14 of the spring member 13 is a portion attached to the back plate 8 of the friction pad 7, and is formed into a squared U shape in cross section that is insertable into the one ear portion 8B. This attachment portion 14 includes two opposite pieces 14A and 14B and a connection piece 14C. The opposite pieces 14A and 14B sandwich the ear portion 8B from the both sides in the thickness direction (the disk axial direction). The connection piece 14C connects these two opposite pieces 14A and 14B in the above-described thickness direction.

Figure 6:
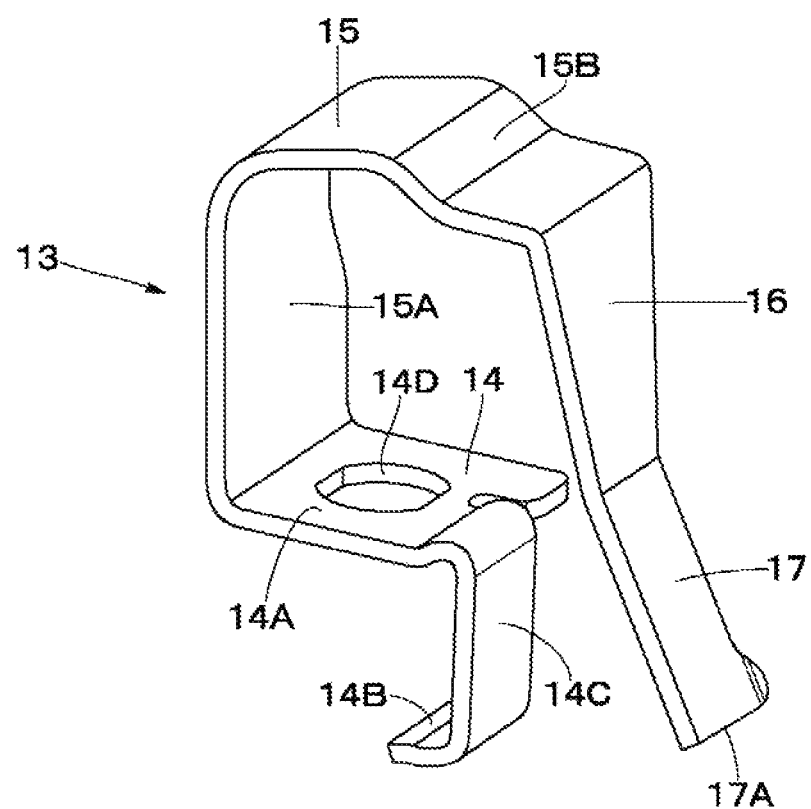
FIG. 6 is a perspective view illustrating the spring member alone.

The opposite piece 14A, which is one of the two opposite pieces 14A and 14B of the attachment portion 14 that is disposed on the back surface 8D side of the back plate 8, is formed into a generally rectangular shape, and the engagement hole 14D is provided so as to extend through the central portion of the opposite piece 14A. The engagement hole 14D is engaged (fitted) with the protrusion 10 of the back plate 8 (the ear portion 8B). As illustrated in FIG. 6, the engagement hole 14D is formed as a hole similarly shaped to the cross-sectional shape of the protrusion 10 of the ear portion 8B. Engaging the protrusion 10 with the engagement hole 14D can contribute to, for example, positioning the spring member 13 relative to the back plate 8 and preventing rattling of the spring member 13.

One end side of the connection piece 14C of the attachment portion 14 is connected to the one opposite piece 14A, and extends from the back surface 8D side toward the lining attachment surface 8A side of the back plate 8 in a direction toward the disk 1 via the groove portion 11 of the ear portion 8B. Further, the other end side of the connection piece 14C extending to the lining attachment surface 8A side of the back plate 8 is connected to the other opposite piece 14B.

Then, the opposite piece 14B of the attachment portion 14 extends from the connection piece 14C along the lining attachment surface 8B of the back plate 8. The attachment portion 14 is formed into a generally squared U shape by the opposite pieces 14A and 14B and the connection piece 14C, and sandwiches the ear portion 8B of the back plate 8, by which the spring member 13 is attached to the friction pad 7.

The extension portion 15 of the spring member 13 extends from the end portion of the opposite piece 14A of the attachment portion 14 (the end portion in the disk circumferential direction) in a direction away from the disk 1 (the lining 9). More specifically, the extension portion 15 is connected to the end portion of the opposite piece 14A on the opposite side of the engagement hole 14D from the connection piece 14C, and extends in a direction away from the back surface 8D of the back plate 8.

Figure 4:
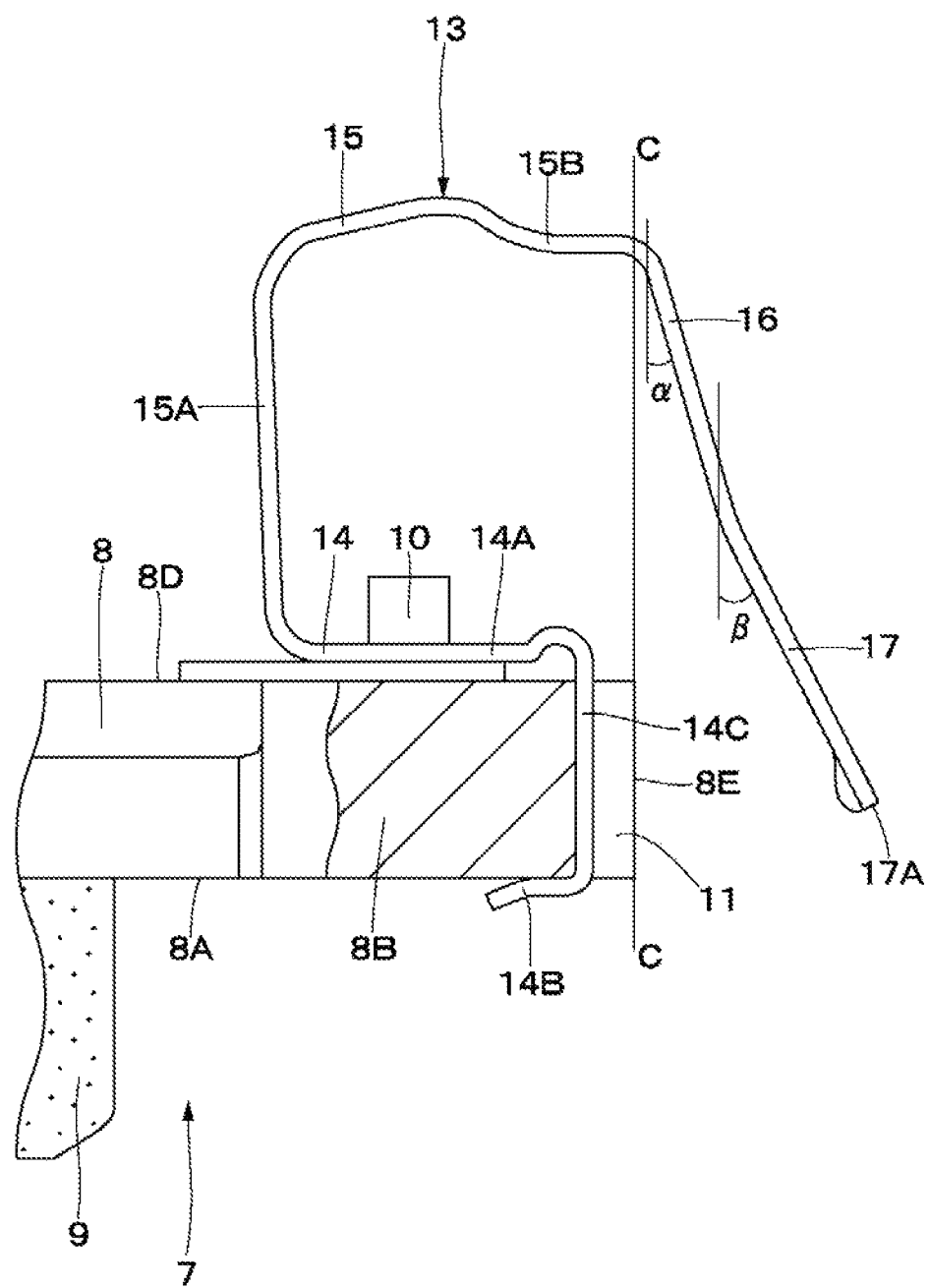
FIG. 4 is a plan view illustrating an ear portion of the friction pad and the spring member in FIG. 3 in an enlarged manner.

Then, the extension portion 15 includes an axial extension plate 15A and a circumferential extension plate 15B. The axial extension plate 15A extends from the opposite piece 14A of the attachment portion 14 along the axial direction of the disk 1. The circumferential extension plate 15B extends from the axial extension plate 15A in a direction toward the torque reception surface 4 on the disk rotationally entering side. In other words, the extension portion 15 is formed as a plate member bent into an L-like shape by the axial extension plate 15A and the circumferential extension plate 15B. In this case, as illustrated in FIG. 4, the circumferential extension plate 15B of the extension portion 15 extends so as to protrude from the axial extension plate 15A toward the torque reception surface 4 side beyond the facing surface 8E of the ear portion 8B (a tangent line C-C of the facing surface 8E of the ear portion 8B in the disk axial direction).

The abutment portion 16 of the spring member 13 is folded back from the circumferential extension plate 15B of the extension portion 15 and extends in the direction toward the disk 1 (the lining 9). As illustrated in FIG. 4, the abutment portion 16 is bent from the circumferential extension plate 15B with an angle α formed between the abutment portion 16 and the disk axial direction, and extends toward between the ear portion 8B and the torque reception surface 4.

The abutment portion 16 abuts against the torque reception surface 4 at a position on the opposite side of the ear portion 8B from the disk 1 and receives a reaction force from the torque reception surface 4 when the ear portion 8B and the torque reception surface 4 abut against each other. In other words, the abutment portion 16 abuts against the torque reception surface 4 at the position on the opposite side of the ear portion 8B from the lining 9 in a direction perpendicular to the lining attachment surface 8A of the back plate 8, and receives the reaction force from the torque reception surface 4, when the ear portion 8B and the torque reception surface 4 abut against each other. In this case, the abutment portion 16 is located on the torque reception surface 4 side with respect to the facing surface 8E of the ear portion 8B. Therefore, the abutment portion 16 abuts against the torque reception surface 4 so as to receive the reaction force when the facing surface 8E of the ear portion 8B abuts against the torque reception surface 4 via the pad spring 6.

Figure 5:
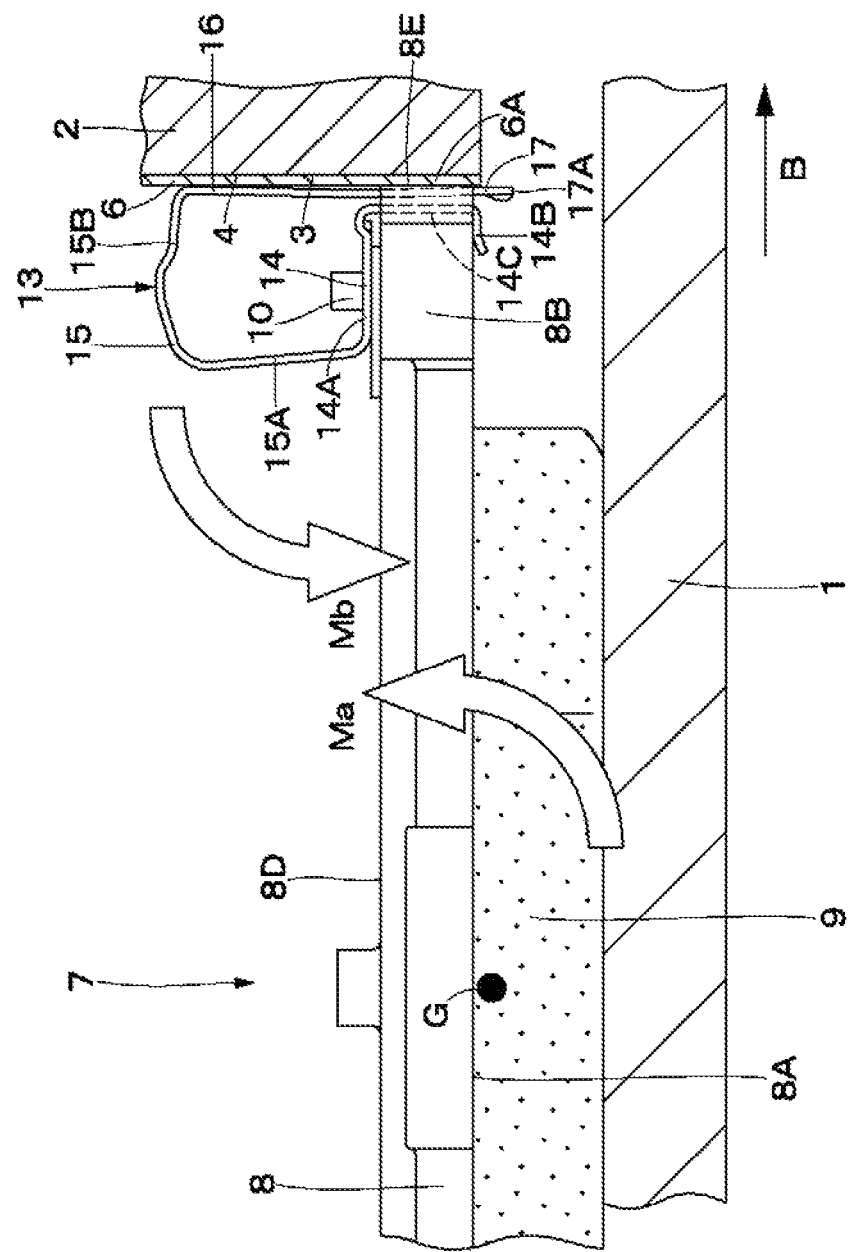
FIG. 5 is a cross-sectional view illustrating the friction pad and the spring member when a vehicle is braked while moving backward in an enlarged manner.

As illustrated in FIG. 5, at the time of the brake operation when the vehicle moves backward, the friction pad 7 is dragged by the disk 1 rotating in the direction indicated by the arrow B and the ear portion 8B contacts the torque reception surface 4 via the pad spring 6. At this time, the abutment portion 16 of the spring member 13 provided to the inner-side friction pad 7 contacts the torque reception surface 4 via the pad spring 6 on the piston 5D side with respect to the ear portion 8B. On the other hand, the abutment portion 16 of the spring member 13 provided to the outer-side friction pad 7 contacts the torque reception surface 4 via the pad spring 6 on the inner leg portion 5A side with respect to the ear portion 8B.

Now, as illustrated in FIG. 5, a moment Ma is generated on the friction pad 7 in the counterclockwise direction around a center of gravity G due to a contact reaction force between the lining 9 of the friction pad 7 and the disk 1 rotating in the direction indicated by the arrow B. This moment Ma causes the ear portion 8B of the friction pad 7 to vibrate in the direction away from the disk 1. This vibration may cause a self-induced vibration of the friction pad 7, thereby causing a brake squeal.

However, the abutment portion 16 of the spring member 13 generates a moment Mb in the clockwise direction on the ear portion 8B of the friction pad 7 by receiving the reaction force from the torque reception surface 4 at a position farther away from the disk 1 than the ear portion 8B of the friction pad 7 is. This moment Mb reduces the moment Ma generated on the friction pad 7. This can contribute to suppressing the self-induced vibration generated on the friction pad 7, thereby reducing the generation of the brake squeal.

The contact portion 17 of the spring member 13 extends from the distal end of the abutment portion 16 in the direction toward the disk 1. As illustrated in FIG. 4, the contact portion 17 is bent toward the torque reception surface 4 in such a manner that an angle θ formed between the contact portion 17 and the disk axial direction exceeds the angle α formed between the abutment portion 16 and the disk axial direction. In other words, the contact portion 17 is bent from the distal end of the abutment portion 16 toward the opposite side from the attachment portion 14 in the disk circumferential direction. The contact portion 17 elastically contacts the torque reception surface 4 on the disk rotationally entering side of the mount member 2 via the pad spring 6 when the friction pad 7 is attached to the mount member 2.

Due to this configuration, the spring member 13 prepresses the friction pad 7 toward the disk rotationally existing side when the vehicle moves forward, thereby eliminating a clearance between the friction pad 7 and the torque reception surface 4 on the disk rotationally existing side. As a result, the generation of a clonk sound (a hitting sound) when the friction pad 7 hits against the torque reception surface 4 is prevented or reduced, when the vehicle is braked while moving forward. Further, an impact force is eased between the friction pad 7 and the torque reception surface 4 due to the elastic force of the contact portion 17 and the generation of the clonk sound is prevented or reduced, when the vehicle is braked while moving backward.

Further, the contact portion 17 extends in such a manner that a distal end 17A thereof protrudes beyond the ear portion 8B toward the disk 1 side when the friction pad 7 is attached to the mount member 2. The distal end 17A of the contact portion 17 generates a sound (an abnormal sound) by contacting the side surface (the surface) of the disk 1 in the axial direction and vibrating when the lining 9 of the friction pad 7 is worn as far as a predetermined portion (a wear limit) set in advance. As a result, a warning can be issued to the driver or the like to indicate that it is time to replace the friction pad 7 (the lining 9 has reached the wear limit).

The disk brake according to the present embodiment is configured in the above-described manner, and the operation thereof will be described next.

First, at the time of the brake operation performed on the vehicle, a brake hydraulic pressure is supplied into the inner leg portion 5A (the cylinder) of the caliper 5, thereby slidably displacing the piston 5D toward the disk 1 and thus causing the inner-side friction pad 7 to be pressed against one side surface of the disk 1. Then, at this time, because the caliper 5 receives a pressing reaction force from the disk 1, the entire caliper 5 is slidably displaced toward the inner side relative to the arm portions 2A of the mount member 2, and therefore the outer leg portion 5C presses the outer-side friction pad 7 against the other side surface of the disk 1.

As a result, the inner-side and outer-side friction pads 7 can sandwich the disk 1 rotating in, for example, the direction indicated by the arrow A in FIGS. 1 and 2 (when the vehicle moves forward) therebetween from the both sides in the disk axial direction, thereby being able to provide a braking force to the brake 1. Then, when the brake operation is released, the supply of the hydraulic pressure into the piston 5D is stopped, whereby the inner-side and outer-side friction pads 7 are separated from the disk 1 and return to a non-braking state again.

On the friction pad 7, the ear portion 8B, which is one of the ear portions 8B and 8C of the friction pad 7 that is located on the disk rotationally entering side, is constantly biased by the contact portion 17 of the spring member 13 in a direction indicated by an arrow D in FIG. 2. Due to this configuration, the ear portions 8C, which is located on the disk rotationally exiting side, is elastically pressed by the biasing force at this time against the torque reception surface 4 of the pad guide 3 via the guide plate portion 6A of the pad spring 6. Therefore, the rattling of the friction pad 7 in the disk circumferential direction due to a vibration or the like when the vehicle runs can be regulated by the spring member 13 disposed between the ear portion 8B on the disk rotationally entering side and the torque reception surface 4.

Then, at the time of the brake operation when the vehicle moves forward, the braking torque that the friction pad 7 receives from the disk 1 (a rotational torque in the direction indicated by the arrow A) can be borne by the arm portion 2A (the torque reception surface 4 of the pad guide 3) on the disk rotationally exiting side. As a result, the ear portion 8C of the friction pad 7 located on the disk rotationally exiting side continues abutting against the torque reception surface 4 of the pad guide 3 via the guide plate portion 6A.

In addition, before the brake operation, the ear portion 8C on the disk rotationally exiting side is in abutment with the guide plate portion 6A due to the biasing force of the contact portion 17 of the spring member 13 and is kept in a state having no clearance (space) generated therebetween, which can prevent or reduce generation of an abnormal sound due to a movement of the friction pad 7. As a result, the present configuration can reduce a brake squeal (a low-pressure squeal) when the vehicle is mildly braked.

On the other hand, when the lining 9 of the friction pad 7 is worn as far as the predetermined portion (the wear limit) set in advance according to, for example, long-term use, the position of the back plate 8 at the time of braking approaches the disk 1. In this case, the distal end 17A of the contact portion 17 of the spring member 13 contacts the side surface (the surface) of the disk 1, and the sound is generated from the spring member 13. As a result, the driver or the like can be notified that it is time to replace the friction pad 7. In other words, the distal end 17A of the contact portion 17 serves as a wear detection portion that detects the wear limit of the lining 9.

Further, at the time of the brake operation when the vehicle moves backward, the friction pad 7 is dragged by the disk 1 rotating in the direction indicated by the arrow B and the ear portion 8B contacts the torque reception surface 4 via the pad spring 6. In this case, the contact portion 17 of the spring member 13 is bent from the abutment portion 16 in such a manner that the distal end 17A is located on the torque reception surface 4 side with respect to the abutment portion 16.

Due to this configuration, at the time of the brake operation when the vehicle moves backward, the friction pad 7 can be gently moved against the elastic force of the contact portion 17 to cause the abutment portion 16 to contact the torque reception surface 4. Further, the friction pad 7 is gently moved against the elastic force of the contact portion 17 of the spring member 13, which contributes to easing the impact force between the ear portion 8B of the friction pad 7 and the torque reception surface 4, thereby being able to prevent or reduce the generation of the clonk sound (the hitting sound) when the ear portion 8B hits against the torque reception surface 4.

Now, in the above-described conventional technique, the spring member presses the friction pad toward the disk rotationally exiting side on a closer side to the disk than the ear portion of the friction pad is. In this case, for example, when the vehicle is mildly braked while moving backward, the ear portion side in contact with the torque reception surface may vibrate in the direction away from the disk due to the low abutment between the friction pad and the torque reception surface. Such a vibration may cause a self-induced vibration of the friction pad, thereby causing a brake squeal (a low-pressure squeal).

To address such inconvenience, in the present embodiment, the abutment portion 16 is provided to the spring member 13. As illustrated in FIG. 4, the abutment portion 16 is located on the opposite side of the ear portion 8B from the disk 1 and protrudes beyond the facing surface 8E of the ear portion 8B toward the torque reception surface 4 side in the state attached to the ear portion 8B of the friction pad 7. Due to this configuration, at the time of the brake operation when the vehicle moves backward, the abutment portion 16 abuts against the torque reception surface 4 at the position farther away from the disk 1 than the ear portion 8B is and receives the reaction force from the torque reception surface 4 when the friction pad 7 is dragged by the disk 1 rotating in the direction indicated by the arrow B and the ear portion 8B contacts the torque reception surface 4.

As illustrated in FIG. 5, the reaction force that the abutment portion 16 receives from the torque reception surface 4 generates the moment Mb in the counterclockwise direction on the friction pad 7. This moment Mb cancels out the moment Ma, which otherwise would cause the generation of the self-induced vibration on the friction pad 7. As a result, the present configuration allows the lining 9 of the friction pad 7 and the disk 1 to stably frictionally contact each other when the vehicle is mildly braked while moving backward, thereby being able to reduce the generation of the brake squeal.

Figure 7:
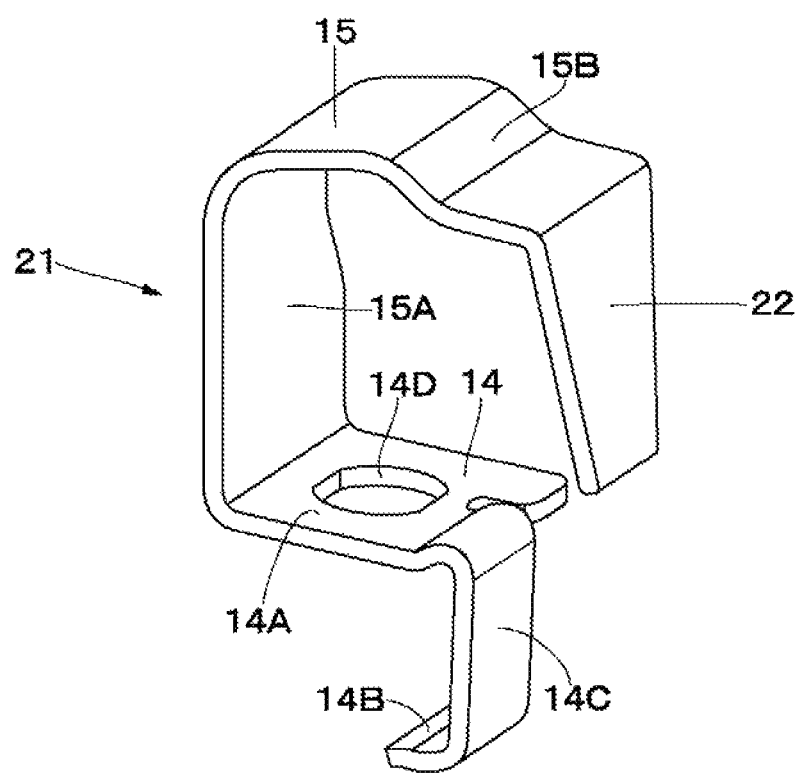
FIG. 7 is a perspective view illustrating a spring member according to a first exemplary modification of the present invention.

The above-described embodiment has been described referring to the example when the contact portion 17 bent from the distal end of the abutment portion 16 is formed on the spring member 13. However, the present invention is not limited thereto, and, for example, a spring member 21 does not include the contact portion 17 formed thereon and includes only an abutment portion 22 formed thereon, which abuts against the torque reception surface 4 on the opposite side of the ear portion 8B from the disk 1, like a first exemplary modification illustrated in FIG. 7. In this case, the abutment portion 22 of the spring member 21 may constantly bias the friction pad 7 in the direction indicated by the arrow D illustrated in FIG. 2.

Figure 8:
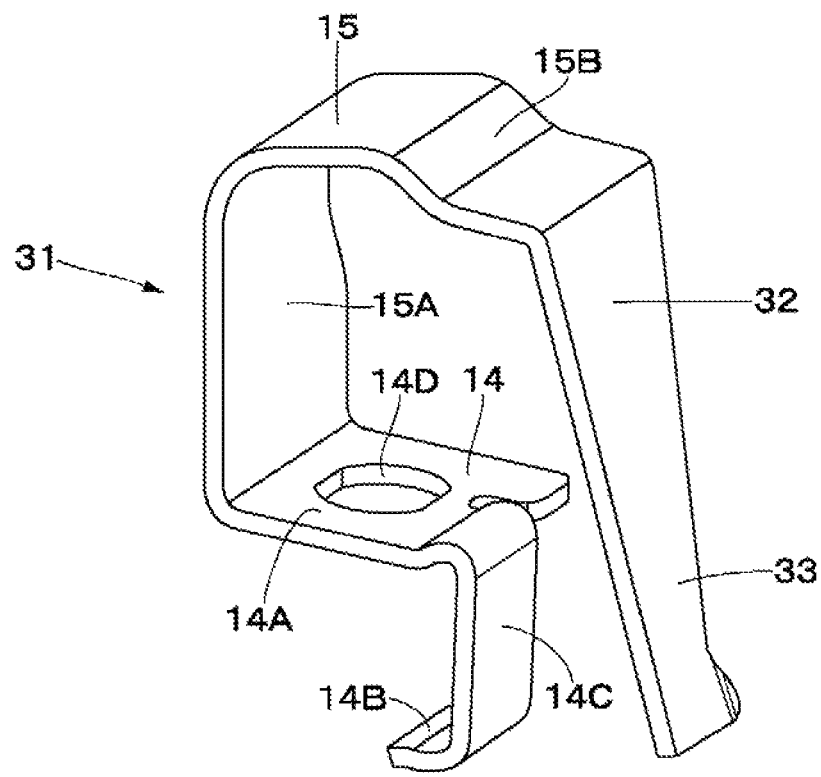
FIG. 8 is a perspective view illustrating a spring member according to a second exemplary modification of the present invention.
Figure 9:
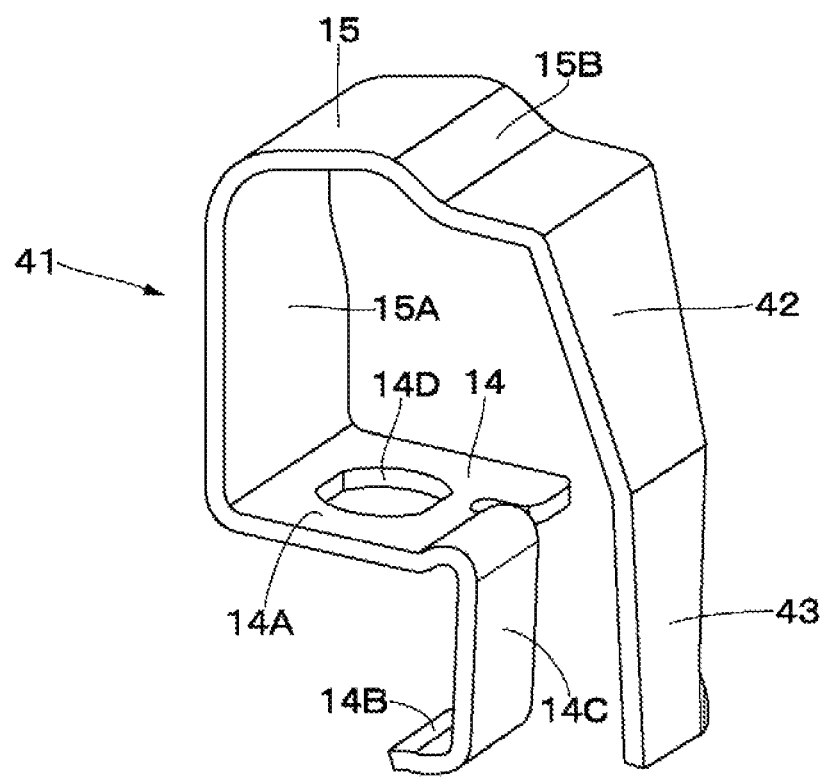
FIG. 9 is a perspective view illustrating a spring member according to a third exemplary modification of the present invention.

Alternatively, the present invention may be configured in such a manner that a spring member 31 includes an abutment portion 32 and a contact portion 33 formed along a straight line without being bent, like a second exemplary modification illustrated in FIG. 8. Alternatively, the present invention may be configured in such a manner that a spring member 41 includes a contact portion 43 formed thereon, which is bent from the distal end of an abutment portion 42 toward the attachment portion 14 side, like a third exemplary modification illustrated in FIG. 9.

The above-described embodiment has been described referring to the example when the protrusion 10 for attaching the spring member 13 is provided on the back surface 8D side of each of the ear portions 8B and 8C of the friction pad 7. However, the present invention is not limited thereto, and, for example, may be configured in such a manner that the engagement hole 14D is formed on the opposite piece 14B of the spring member 13 and a protrusion for attaching the spring member 13 is provided on the lining attachment surface 8A side of each of the ear portions 8B and 8C of the friction pad 7. The same also applies to the first, second, and third exemplary modifications.

Further, the above-described embodiment has been described referring to the example of a so-called floating caliper-type disk brake configured in such a manner that the piston 5D is slidably provided in the inner leg portion 5A of the caliper 5 via the cylinder, and the outer leg portion 5C of the caliper 5 is brought into abutment with the outer-side friction pad 7. However, the present invention is not limited thereto, and may be applied to, for example, a so-called opposed piston-type disk brake configured in such a manner that pistons are provided on the inner side and the outer side of the caliper, respectively.

Possible configurations as a disk brake and a friction pad based on the above-described embodiment include the following examples.

As a first configuration of the disk brake, the disk brake includes a mount member fixed to a vehicle while extending across over a disk and including a torque reception surface that receives a torque when the vehicle is braked, and a friction pad including a back plate supported by the mount member and a lining as a friction member attached to this back plate. The back plate includes ear portions formed at side surface portions located on both sides in a disk circumferential direction. Each of the ear portions is configured to transmit the torque when the vehicle is braked by abutting against the torque reception surface of the mount member. The disk brake further includes a caliper slidably provided to the mount member and configured to press the friction pad against the disk, and a biasing portion provided between one of the ear portions of the friction pad that is located on a disk rotationally entering side when the vehicle moves forward, and the torque reception surface of the mount member that faces this one ear portion. The biasing portion is configured to bias the friction pad toward a disk rotationally exiting side. The biasing portion includes an attachment portion attached to the back plate, an extension portion extending from an end portion of the attachment portion in a direction away from the disk, and an abutment portion folded back from the extension portion and extending in a direction toward the disk. The abutment portion is configured to receive a reaction force from the torque reception surface by abutting against the torque reception surface at a position on an opposite side of the ear portion from the disk.

As a second configuration, in the first configuration, the extension portion includes an axial extension plate and a circumferential extension plate. The axial extension plate extends from the attachment portion along a disk axial direction. The circumferential extension plate extends from the axial extension plate in a direction toward the torque reception surface. The abutment portion extends from the circumferential extension plate toward between the ear portion and the torque reception surface.

As a third configuration, in the second configuration, a contact portion is provided at a distal end of the abutment portion. The contact portion is bent toward the torque reception surface so as to increase an angle generated between the abutment portion and the disk axial direction and elastically contacts the torque reception surface.

As a first configuration of the friction pad, the friction pad includes a back plate, and a lining as a friction member attached to this back plate. An ear portion is formed on each of both sides of the back plate in a longitudinal direction. The ear portion includes a biasing portion. The biasing portion includes an attachment portion attached to the back plate, an extension portion extending from an end portion of the attachment portion in a direction away from the lining, and an abutment portion folded back from the extension portion and extending in a direction toward the lining. The abutment portion is configured to receive a reaction force from a torque reception surface by abutting against the torque reception surface at a position on an opposite side of the ear portion from the lining in a direction perpendicular to a lining attachment surface of the back plate when the friction pad is mounted on the disk brake and the ear portion abuts against the torque reception surface of this disk brake.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-139324 filed on Jul. 25, 2018. The entire disclosure of Japanese Patent Application No. 2018-139324 filed on Jul. 25, 2018 including the specification, the claims, the drawings, and the abstract is incorporated herein by reference in its entirety.

REFERENCE SIGNS LIST 1 disk
2 mount member
4 torque reception surface
5 caliper
7 friction pad
8 back plate
8A lining attachment surface
8B, 8C ear portion
9 lining
13, 21, 31, 41 spring member (biasing portion)
14 attachment portion 15 extension portion
15A axial extension plate
15B circumferential extension plate
16, 22, 32, 42 abutment portion
17 contact portion

The invention claimed is:

1. A disk brake comprising:

a mount member fixed to a vehicle while extending across over a disk, and including torque reception surfaces that receive a torque when the vehicle is braked;

a friction pad including a back plate supported by the mount member and a lining as a friction member attached to the back plate, the back plate including ear portions formed at side surface portions located on both sides in a disk circumferential direction, each of the ear portions being configured to transmit the torque when the vehicle is braked by abutting against the associated torque reception surface of the mount member;

a caliper slidably provided to the mount member, the caliper being configured to press the friction pad against the disk; and a biasing portion provided between one of the ear portions of the friction pad that is located on a disk rotationally entering side when the vehicle moves forward, and the torque reception surface of the mount member that faces the one ear portion, the biasing portion being configured to bias the friction pad toward a disk rotationally exiting side, wherein the biasing portion includes;

an attachment portion attached to the back plate;

an extension portion extending from an end portion of the attachment portion in a direction away from the disk; and an abutment portion folded back from the extension portion and extending in a direction toward the disk, the abutment portion being configured to receive a reaction force from the torque reception surface by abutting against the torque reception surface at a position on an opposite side of the one ear portion from the disk, wherein the extension portion includes an axial extension plate and a circumferential extension plate, the axial extension plate extending from the attachment portion along a disk axial direction, the circumferential extension plate extending from the axial extension plate in a direction toward the torque reception surface, wherein the abutment portion extends from the circumferential extension plate in a direction toward the disk and between the one ear portion and the torque reception surface, and wherein a contact portion is provided at a distal end of the abutment portion, the contact portion being bent toward the torque reception surface so as to increase an angle generated between the abutment portion and the disk axial direction, and the contact portion elastically contacts the torque reception surface.

* * * * *